June 3, 1930.  R. W. ANDREWS  1,761,170
FLUID SEPARATOR
Filed Sept. 17, 1927   2 Sheets-Sheet 1
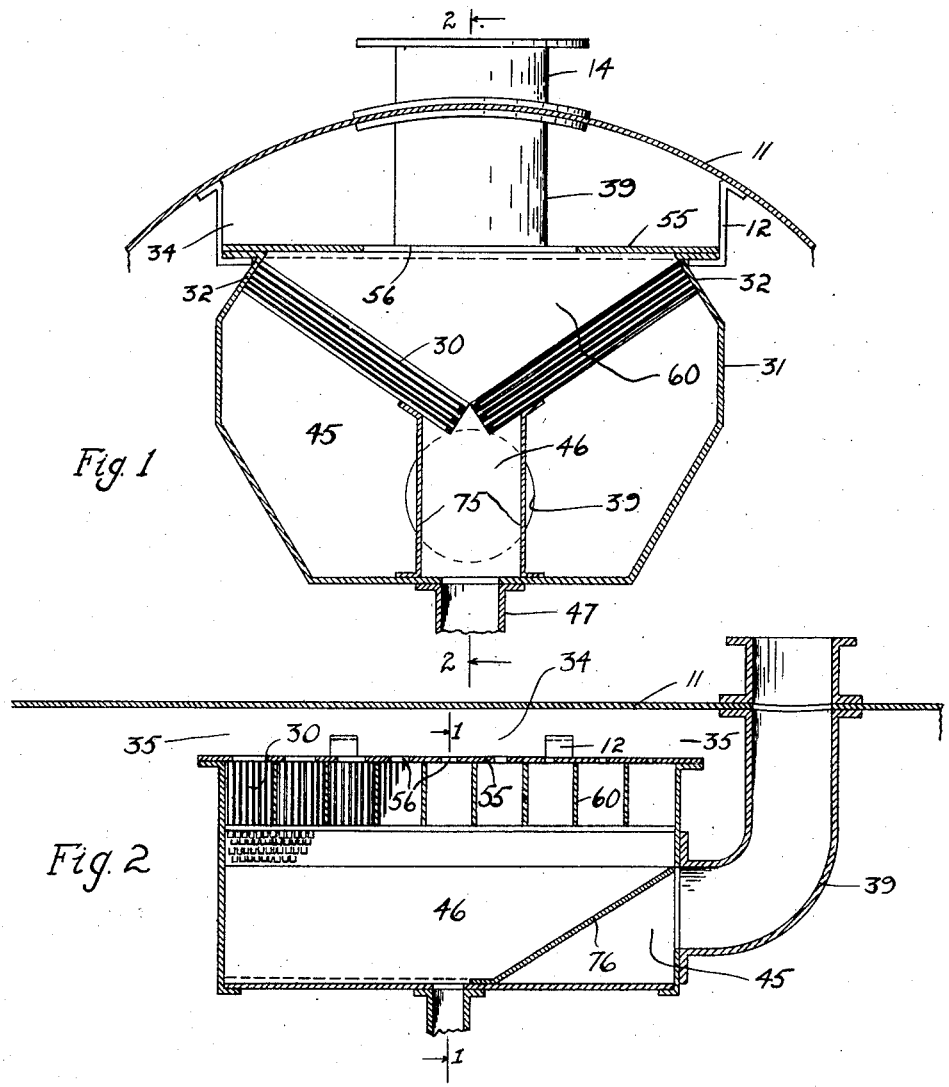
Fig. 1
Fig. 2
Fig. 3
INVENTOR:
Roger W. Andrews
By 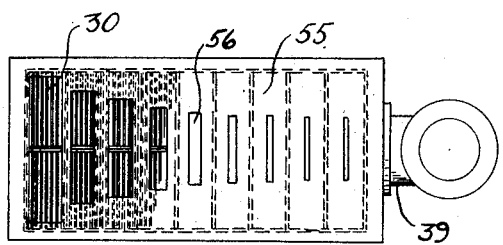
Atty.

June 3, 1930.  R. W. ANDREWS  1,761,170
FLUID SEPARATOR
Filed Sept. 17, 1927   2 Sheets-Sheet 2
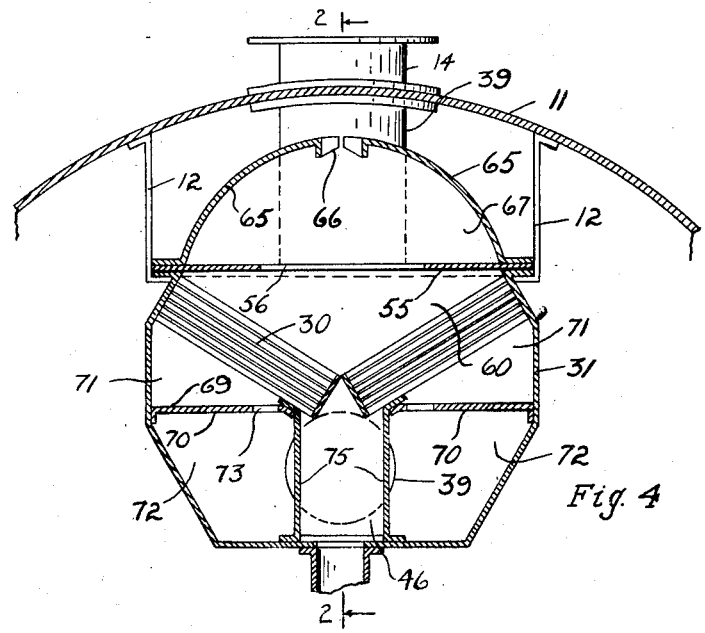
Fig. 4
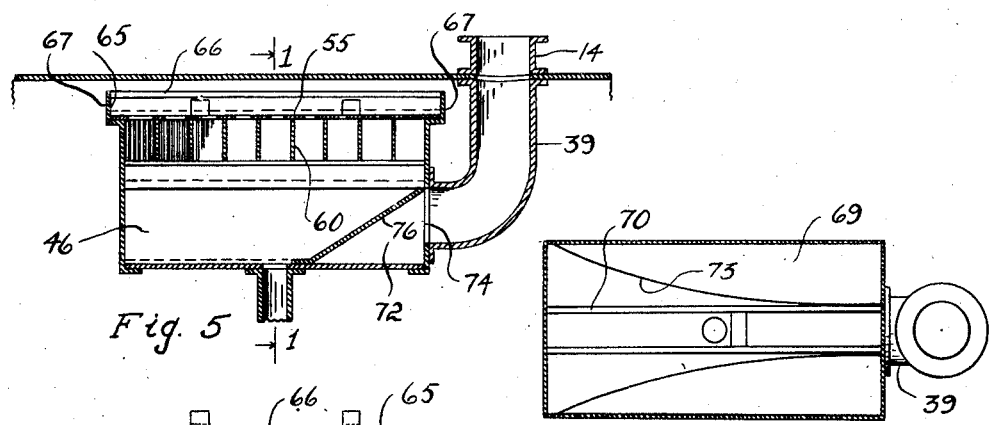
Fig. 5
Fig. 7
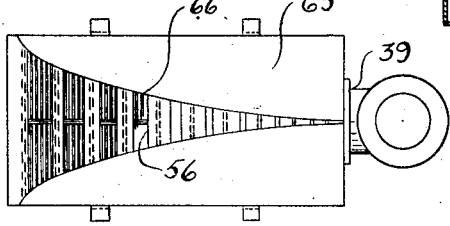
Fig. 6
INVENTOR:
Roger W. Andrews
By E. J. Andrews
Atty.

Patented June 3, 1930

1,761,170

UNITED STATES PATENT OFFICE

ROGER W. ANDREWS, OF PITTSBURGH, PENNSYLVANIA, ASSIGNOR TO BLAW-KNOX COMPANY, OF BLAWNOX, PENNSYLVANIA, A CORPORATION OF NEW JERSEY

FLUID SEPARATOR

Application filed September 17, 1927. Serial No. 220,103.

This invention relates to fluid separators for separating liquids or other impurities from gases. The particular application of the separator which is illustrated and described in this specification is to steam boilers for drying and purifying the steam as it passes from the boiler to the steam main; but it is to be understood that the invention applies to various other uses.

One of the objects of the invention is to provide a separator, the gas inlets and purifying baffles of which are located on the upper side of the separator, so that the gas, and particularly the steam in cases of steam boilers, enters at the top and is thus ordinarily drier than steam which enters the separator on the sides. Another object is to provide a compact separator which at the same time has ample passageways for the gas and for the liquid which is separated from the gas. Another object of the invention is to provide for proper distribution of the steam through all portions of the purifying baffles of the separator. Other objects of the invention will be apparent from a consideration of the accompanying drawings and the following description thereof:

Of the drawings Fig. 1 is a transverse sectional view of a separator mounted in a boiler, which embodies the features of my invention, the section being taken along the line 1—1 of Fig. 2; Fig. 2 is a reduced longitudinal sectional view along the line 2—2 of Fig. 1; Fig. 3 is a further reduced plan view of the separator; Fig. 4 is a transverse sectional view of a modified form of the separator, along the line 1—1 of Fig. 5; Fig. 5 is a reduced longitudinal sectional view along the line 2—2 of Fig. 4; Fig. 6 is a plan view of the separator of Fig. 5; and Fig. 7 is a plan view of the same separator with the baffles and top removed.

The separator, which I prefer to illustrate my invention, comprises a casing 31 which is mounted, in any suitable manner, in a steam boiler 11. In this instance the separator is supported by hangers 12 in the upper steam space of the boiler. The separator has a steam outlet 39 communicating with the steam main 14 of the boiler system. Within the casing is mounted steam purifying mechanism, such as the baffles 30. These baffles may be of any suitable form, I prefer for the purpose in this instance trough-shaped staggered baffles such as are in common use. These baffles are grouped into cartons or banks one on each side of the upper portion of the separator and with the troughs inclined downwardly and inwardly; so that, as the steam passes through the baffles, the moisture and other impurities, in a well known manner, are separated from the steam and flow downwardly towards the inner lower ends of the baffles.

The outer ends of the banks of baffles are closed by the respective plates 32, so that the steam is forced to enter the separator through the side passageways 34, or through the end passageways 35, thus passing from the upper portion of the steam space of the boiler where the drier steam is found. In this instance the steam then passes downwardly through the baffles into the chamber 45 and out of the steam outlet 39 to the steam main 14 of the boiler system outside of the boiler 11. At the same time the moisture and other impurities separated from the steam passes inwardly and downwardly along the baffles and out of the lower ends of the baffles into the water passageway 46 and thence out of the purifier through the drain pipe 47, from which it flows wherever desired.

In this way, after passing through the purifier baffles, the steam is kept entirely separated from the moisture as there is no passageway or opening between the passageways 45 and 46; and ample space is provided for the passageway of both the steam and the water. At the same time the size of the purifier is reduced to a minimum consistent with efficiency; and the steam passes into the purifier from the upper central portion of the boiler where ordinarily the driest steam prevails.

I have found it desirable to have the rate of flow of the steam substantially uniform throughout all portions of the baffles. It is, therefore, desirable to maintain the pressure drop substantially uniform through all portions of the baffles. As the steam passes out of the separator in this instance at one end, the speed of the steam through the baffles at that end would ordinarily be greater than towards the other end of the separator; and, to provide for more uniform speed through the baffles, I provide means for increasing relatively the flow through the baffles more and more as the steam outlet 39 is receded from.

In this instance the means which I provide for thus increasing the flow comprises the plate 55 which, except for the openings 56 therein, completely covers the upper portion of the separator. In this plate I provide the openings or inlets 56 for the passage of the steam into the separator. These inlets may be positioned and shaped and of such relative size as to more properly distribute the steam to the baffles, the object being to increase the flow relatively at portions remote from the outlet 39 of the separator. To provide for this I prefer to have the openings or inlets remote from the outlet end wider and longer than those nearer the other end; so that as the far end is approached the capacity of the inlets is materially increased relatively. I prefer to make the outer inlet very materially longer and wider than the others, as I find that such an arrangement is preferable. It is to be understood, however, that these inlets may be shaped otherwise and may be uniform in shape if desired, depending upon special conditions.

In order to further improve the distribution by the various baffles, and for other reasons, I provide plates 60 which extend downwardly, preferably midway between each pair of adjacent openings 56, to the baffles 30, so that the steam entering any particular opening 56 is confined to the particular baffles which lie beneath the space between the adjacent plates 60 which are associated with the opening. However, it is to be understood that these plates may be dispensed with if desired.

In Figs. 4, 5, 6, and 7 I illustrate a modified form of separator. In this case plates 65 are mounted over the separator, thus preventing steam from entering the separator except through the passageway 66 formed by the adjacent edges of these plates. End plates 67 prevent the steam from entering at the ends. In this case the plate 55 may be used or not as may be desired.

In order to assist in the proper distribution of the steam through the baffles I prefer to make the slot 66 tapering and increasing in width as the outlet 39 is receded from. Preferably the sides of this slot are curved so that the width of the slot increases at a greater rate than the increase in distance from the end of the slot adjacent the outlet of the separator. This slot of varying width is particularly desirable in case the plate 55 is dispensed with or in case the openings 56 of said plate are made uniform in size.

Also in this modified form of separator I prefer to provide plates 69 and 70 which divide the chamber 45 of Fig. 1 into two chambers 71 and 72. The steam passing through the baffles 30 passes through the chambers 71, thence through openings 73 into the chamber 72, and thence out to the outlet 39 through the opening 74 which communicates with the chamber 72. The openings 73 are formed by the adjacent edges of the plates 69 and 70, and these openings 73 are also, preferably, made increasing in width as the outlet 39 is receded from, and also, preferably, increasing at a rate greater than the rate of recession from the outlet. Plates 75 and 76 separate the steam chambers from the water chambers 46.

I claim as my invention:—

1. A steam separator comprising a casing, baffles mounted in the upper portion of said casing, said casing having a steam and a water chamber mounted beneath said baffles, one side of each chamber being formed by said baffles, said casing having a steam outlet and a water outlet, said steam chamber communicating with said steam outlet, said water chamber communicating with said water outlet, and means mounted over said steam chamber for distributing the flow of steam to said baffles, said distributing means comprising means for relatively increasing the steam flow at points remote from said steam outlet more than at points nearer said outlet, said means comprising plates mounted over said baffles, the inner adjacent edges thereof being spaced apart.

2. A steam separator as claimed in claim 1 in which said inner adjacent edges are spaced apart materially more at the end most remote from the steam outlet than at the end adjacent said outlet.

3. A fluid separator comprising a casing, said casing having a fluid inlet on its upper side, a fluid outlet, and a liquid outlet in its bottom, said casing being otherwise closed, steam purifying baffles mounted beneath said inlet, said baffles comprising elongated troughs, said troughs running transversely of said casing and being inclined downwardly and inwardly, and terminating about midway of the sides of said casing, plates mounted above said baffles and extending from the outer ends thereof upwardly and inwardly, the inner edges of said plates being adjacent but spaced, and end plates connecting the casing of said separator with the ends of said upwardly extending plates.

4. A fluid separator as claimed in claim 3 in which the adjacent, spaced edges of said plates are closer together near the outlet end of said separator than at the other end thereof.

In testimony whereof, I hereunto set my hand.

ROGER W. ANDREWS.